United States Patent
Tian et al.

(10) Patent No.: US 12,158,839 B2
(45) Date of Patent: Dec. 3, 2024

(54) METHOD AND APPARATUS FOR ALLOCATING MEMORY AND ELECTRONIC DEVICE

(71) Applicant: BEIJING BAIDU NETCOM SCIENCE TECHNOLOGY CO., LTD., Beijing (CN)

(72) Inventors: Chao Tian, Beijing (CN); Lei Jia, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 374 days.

(21) Appl. No.: 17/454,900

(22) Filed: Nov. 15, 2021

(65) Prior Publication Data
US 2022/0147441 A1    May 12, 2022

(30) Foreign Application Priority Data
Dec. 15, 2020   (CN) .......................... 202011480605.7

(51) Int. Cl.
| G06F 12/02 | (2006.01) |
| G10L 15/16 | (2006.01) |
| G10L 15/22 | (2006.01) |
| G10L 15/28 | (2013.01) |

(52) U.S. Cl.
CPC .......... *G06F 12/0223* (2013.01); *G10L 15/16* (2013.01); *G10L 15/22* (2013.01); *G10L 15/285* (2013.01); *G06F 2212/1044* (2013.01)

(58) Field of Classification Search
CPC .......... G10L 15/22; G10L 15/26; G10L 15/16
See application file for complete search history.

(56) References Cited

U.S. PATENT DOCUMENTS

| | | | |
|---|---|---|---|
| 10,210,860 B1 | 2/2019 | Ward et al. | |
| 11,562,213 B2* | 1/2023 | Choe | G06N 3/045 |
| 2017/0148433 A1* | 5/2017 | Catanzaro | G10L 25/18 |
| 2018/0166067 A1 | 6/2018 | Dimitriadis et al. | |
| 2020/0020322 A1* | 1/2020 | Guevara | G10L 15/16 |
| 2021/0103473 A1* | 4/2021 | Lin | G06N 3/045 |
| 2021/0118429 A1* | 4/2021 | Shan | G10L 15/16 |
| 2021/0142154 A1* | 5/2021 | Pang | G06F 3/0631 |

(Continued)

FOREIGN PATENT DOCUMENTS

| CN | 110704197 A | 1/2020 |
| CN | 110858162 A | 3/2020 |

(Continued)

OTHER PUBLICATIONS

Office Action issued for corresponding Japanese patent application 2021-186753, mailed Nov. 29, 2022 (8 pages).

(Continued)

*Primary Examiner* — Mark Villena
(74) *Attorney, Agent, or Firm* — Osha Bergman Watanabe & Burton LLP

(57) ABSTRACT

The disclosure provides a method and an apparatus for allocating memory, and an electronic device. Multiple frames of speech data are received and input to a neural network model. The neural network model is configured to ask for multiple data tensors when processing the multiple frames of speech data, and the multiple data tensors share a common memory.

12 Claims, 3 Drawing Sheets

(56) References Cited

U.S. PATENT DOCUMENTS

| | | | | |
|---|---|---|---|---|
| 2021/0256427 A1* | 8/2021 | Schott | | G06N 20/10 |
| 2021/0358490 A1* | 11/2021 | Vaidya | | G10L 15/22 |
| 2022/0365782 A1* | 11/2022 | Wang | | G06F 17/16 |
| 2022/0405221 A1* | 12/2022 | Wang | | G06N 3/063 |

FOREIGN PATENT DOCUMENTS

| | | |
|---|---|---|
| CN | 111179913 A | 5/2020 |
| CN | 111401538 A | 7/2020 |
| CN | 111798875 A | 10/2020 |
| CN | 111814971 A | 10/2020 |
| JP | 2009229921 A | 10/2009 |

OTHER PUBLICATIONS

Office Action issued for corresponding Chinese patent application 202011480605.7 mailed on Aug. 31, 2022 (20 pages).

Zhang Luo, et al. "Multi-tensor filling based on multi-source sharing factor;" Science China Press; Mar. 28, 2016 (36 pages).

Huang Dezhi et al. "A parametric model for voice conversion;" Department of Computer Science and Techology, Tsinghua University; Jun. 24, 2006 (7 pages).

* cited by examiner

METHOD AND APPARATUS FOR ALLOCATING MEMORY AND ELECTRONIC DEVICE

CROSS REFERENCE TO RELATED APPLICATION(S)

This application claims priority and benefits to Chinese Application No. 202011480605.7, filed on Dec. 15, 2020, the entire content of which is incorporated herein by reference.

TECHNICAL FIELD

The disclosure relates to a field of computer technologies, a field of artificial intelligence technologies, a field of speech technologies, and a field of deep learning technologies, and more particularly to a method and an apparatus for allocating memory, and an electronic device.

BACKGROUND

Artificial intelligence is booming in recent years on the basis of the deep learning and neural network. Since the neural network often has many layers and a large tensor, more memory of the chip may be consumed. In recent years, the requirement of deploying the neural network on an embedded device is increasing.

SUMMARY

In one embodiment, a method for allocating memory is provided. The method includes: receiving multiple frames of speech data; inputting the multiple frames of speech data to a neural network model. The neural network model asks for multiple data tensors when processing the multiple frames of speech data, and the multiple data tensors share a common memory.

In one embodiment, an electronic device is provided. The electronic device includes: at least one processor; and a memory communicatively coupled to the at least one processor. The memory stores instructions executable by the at least one processor. The instructions are executed by the at least one processor, so that the at least one processor is configured to execute a method for allocating memory as described above.

In one embodiment, a non-transitory computer-readable storage medium having computer instructions stored thereon is provided. The computer programs are stored on the non-transitory computer-readable storage medium. The computer instructions are configured to cause the computer to execute a method for allocating memory as described above.

Other effects of the above alternative ways will be described below in combination with the specific embodiment.

BRIEF DESCRIPTION OF THE DRAWINGS

The drawings are intended to make the skilled person in the art to well understand the solution, and do not constitute a limitation to the disclosure.

DETAILED DESCRIPTION

Figure 1:
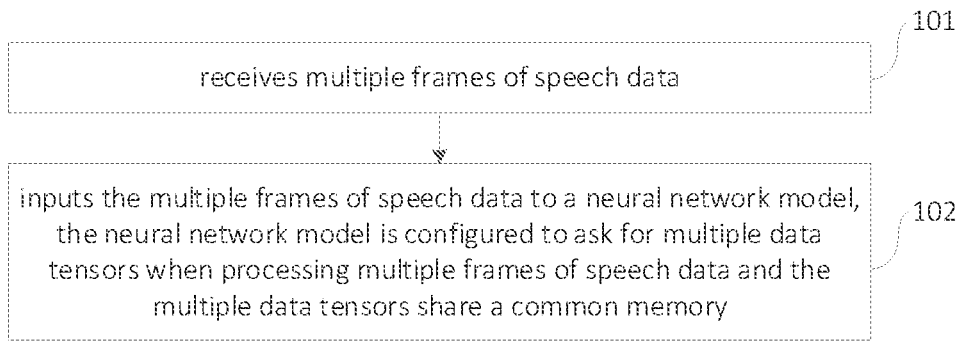
FIG. 1 is a flowchart illustrating a method for allocating memory according to embodiments of the disclosure.

The exemplary embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

A method and an apparatus for allocating memory, and an electronic device are described referring to drawings below in combination with embodiments of the disclosure.

The artificial intelligence is a subject that studies how to simulate certain thinking processes and intelligent behaviors (such as learning, reasoning, thinking, planning, etc.) of human beings by using a computer, which covers both the hardware-level technologies and the software-level technologies. The artificial intelligent hardware technology generally includes technologies such as sensor, dedicated artificial intelligent chip, cloud computing, distributed storage, and big data processing. The artificial intelligent software technology include computer vision technology, speech recognition technology, natural language processing technology and deep learning, big data processing technology, and knowledge graph technology.

A speech technology refers to a key technology in the field of computer, including an automatic speech recognition technology and a speech synthesis technology.

The deep learning is a new research direction in the field of machine learning. The deep learning learns inherent regulations and representation hierarchy of sample data. This information obtained in the learning process is of great help in interpretation of data such as words, images and sounds. The final goal is to allow the machine to have analytic learning ability like humans, which may recognize data such as words, images, and sounds. The deep learning is a complicated machine learning algorithm, which is outperformed the related arts in the speech and image recognition.

The method for allocating memory according to embodiments of the disclosure may be executed by an electronic device. The electronic device may be a personal computer (PC), a tablet computer, a handheld computer and a smart audio, which is not limited here.

In embodiments of the disclosure, the electronic device can be provided with a processing component, a storage component and a drive component. In some embodiments, the drive component and the processing component may be integrated. The storage component may store an operating system, applications or other program modules. The processing component is configured to implement a method for allocating memory according to embodiments of the disclosure by executing the application programs stored in the storage component.

FIG. 1 is a flowchart illustrating a method for allocating memory according to embodiments of the disclosure.

The method for allocating memory according to embodiments of the disclosure may be also executed by an apparatus for allocating memory according to embodiments of the disclosure. The apparatus may be integrated into the electronic device. The multiple frames of speech data is received and input to the neural network model. The neural network model asks for multiple data tensors while processing the multiple frames of speech data, and the multiple data tensors share a common memory, to reduce the memory overhead.

As a possible case, the method for allocating memory according to embodiments of the disclosure may be executed on a server side. The server may be a cloud server, such that the method for allocating memory can be executed on the cloud server.

As illustrated in FIG. 1, the method for allocating memory may include the following.

At block 101, multiple frames of speech data are received.

In embodiments of the disclosure, the electronic device may receive the multiple frames of speech data. It is to be noted that, the multiple frames of speech data mentioned in embodiments may be temporarily stored in a sound file (for example, a file in a WAV format), such that the electronic device can receive (or obtain) the multiple frames of speech data easily or the electronic device can directly receive the speech information input by the user through a microphone and converts the speech information into the multiple frames of speech data, which is not limited in the disclosure.

At block 102, the multiple frames of speech data are input to a neural network model. The neural network model asks for multiple data tensors while processing the multiple frames of speech data, and the multiple data tensors share a common memory.

It is to be noted that, the neural network model mentioned herein may be trained and stored in advance in the storage space of the electronic device for the convenience of calling and using. The storage space is not limited to a storage space of a physical entity, for example, a hard disk. The storage space may also be a storage space (e.g., a cloud memory space) of a network hard disk connected to the electronic device. The neural network model may be a scoring-based neural network model for scoring the multiple frames of speech data and the neural network model may include multiple layers.

In detail, after receiving the multiple frames of speech data, the electronic device may call the neural network model from its own storage space, and input the multiple frames of speech data to the neural network model such that the multiple frames of speech data are scored through the neural network model to obtain the scoring result output by the neural network model. It is to be noted that, after receiving the multiple frames of speech data, the electronic device may further divide the multiple frames of speech data into multiple segments based on a preset algorithm, and sequentially input the segments of the multiple frames of speech data to the neural network model. The preset algorithm may be calibrated based on the actual situation.

In order to improve the scoring accuracy, in embodiments of the disclosure, after receiving the multiple frames of speech data, the electronic device may process the multiple frames of speech data in advance, for example, to eliminate an influence on the quality of the speech data due to aliasing, high harmonic distortion, high frequency of the human's vocal organ and the speech collection device.

Further, in embodiments of the application, the multiple data tensors asked for by the neural network model while processing the multiple frames of speech data may be temporary. The multiple data tensors may be configured to temporarily store data exchanged between layers and the multiple data tensors may share the common memory.

It is to be noted that, the multiple data tensors mentioned in embodiments may be released after a certain condition is met. For example, after some data tensors are called by a layer A (for example, a certain layer of a neural network model) as inputs, these data tensors cannot be called by other layers any longer. After the calculation of the A layer is finished, the data tensors may be released, thereby reducing occupancy of the memory.

In addition, in some neural network structures, most of the data tensors may only be connected to one input layer A and can be the only output of another layer B. The memory of these data tensors may be reused, thereby reducing the memory overhead.

In embodiments of the disclosure, the multiple frames of speech data are received and input to the neural network model, such that the multiple frames of speech data are scored through the neural network model, thereby effectively reducing memory overhead and ensuring a balance between the memory and the computation.

Further, in some embodiments of the disclosure, the method for allocating memory may further include allocating a memory amount for the common memory based on the number of frames of current speech data.

In detail, after the electronic device inputs the multiple frames of speech data to the neural network model, the memory amount may be allocated for the common memory through the neural network model based on the number of frames of the current speech data, such that the common memory can be fully utilized in the scoring process that the neural network model scores the multiple frames of speech data, thereby further reducing the memory overhead.

In some embodiments, after the electronic device inputs the multiple frames of speech data to the neural network model, the memory amount may be allocated for the common memory directly based on the number of frames of the current speech data, such that the common memory can be fully utilized in the scoring process that the neural network model scores the multiple frames of speech data.

To clarify the above embodiments, allocating the memory amount for the common memory based on the number of frames of the current speech data may include: when the current speech data is first-frame speech data, allocating the memory amount for the common memory in a first allocation mode; and when the current speech data is not the first-frame speech data, allocating the memory amount for the common memory in a second allocation mode.

In embodiments of the disclosure, the first-frame speech data may be frames of speech data within a preset time. The preset time may be set based on the actual situation. For example, the first-frame speech data is the frames of speech data within 20 ms or 30 ms. That is, the first-frame speech data does not a first frame of speech data. Instead, the first-frame speech data refers to multiple frames of speech data, for example, 20 frames of speech data.

In detail, after the electronic device inputs the multiple frames of speech data to the neural network model, it may be determined whether the current speech data is the first-frame speech data through the neural network model. When the current speech data is the first-frame speech data, the memory amount is allocated for the common memory in the first allocation mode. When the current speech data is not the first-frame speech data, the memory amount is allocated to the common memory in the second allocation mode. Thus, the method for allocating memory in combination with a single-frame allocation mode and a multi-frame allocation mode may improve efficiency while achieving a balance between the memory and the computation.

It is to be noted that, the first allocation mode mentioned in embodiments may be a single-frame allocation mode or a multi-frame allocation mode, and the second allocation mode mentioned in embodiments may be a multi-frame allocation mode. In certain cases, the first allocation mode and the second allocation mode may be the same. That is, both the first allocation mode and the second allocation mode are the multi-frame allocation mode. For example, when only the first-frame mode is used for the speech data, the first allocation mode may be the single-frame allocation mode. When not only the first-frame mode, but also the multi-frame mode are used for the speech data, the first allocation mode may be the multi-frame allocation mode, which is not limited here. The first-frame mode and the multi-frame mode may be calibrated based on actual conditions.

Figure 2:
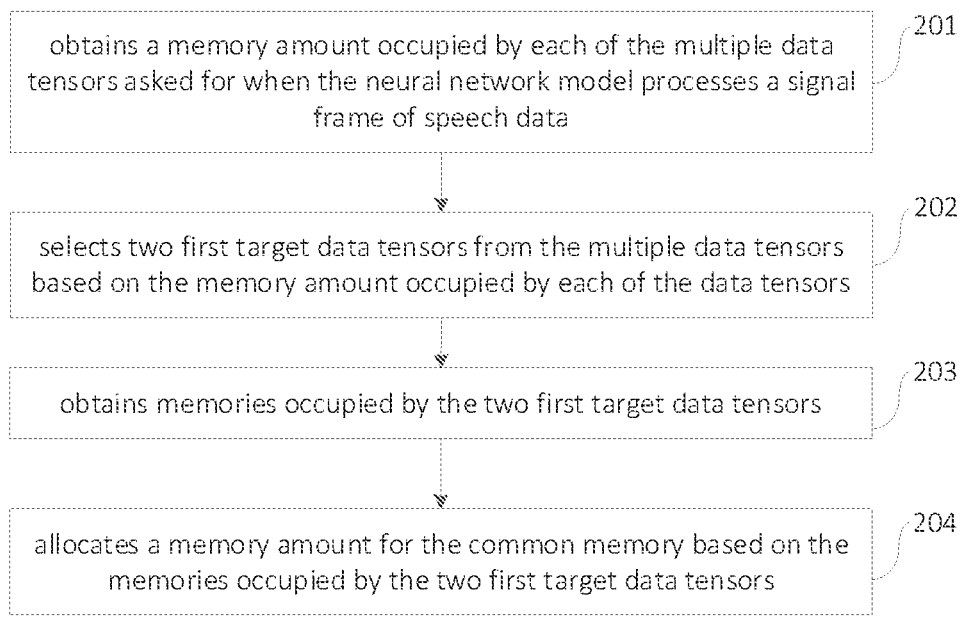
FIG. 2 is a flowchart illustrating another method for allocating memory according to embodiments of the disclosure.

In order to clarify the above embodiments, as illustrated in FIG. 2, allocating the memory amount for the common memory in the first allocation mode may include the following.

At block 201, a memory amount occupied by each of the multiple data tensors asked for when the neural network model processes a single frame of speech data is obtained.

It is to be noted that, each data tensor mentioned in embodiments generally has four dimensions, i.e., n, c, h, and w. In the actual application, a single frame is represented by h==1, n generally equals to 1. Therefore, a single-frame memory size may be c*w.

At block 202, two first target data tensors are selected from the multiple data tensors based on the memory amount occupied by each of the data tensors.

In embodiments of the disclosure, the two first target data tensors are the top two of single-frame memory overhead among the multiple data tensors.

At block 203, memories occupied by the two first target data tensors are obtained.

At block 204, a memory amount is allocated for the common memory based on the memories occupied by the two first target data tensors.

In detail, after the electronic device inputs the multiple frames of speech data to the neural network model, it may be determined whether the current speech data is the first-frame speech data through the neural network model. When the current speech data is the first-frame speech data, the memory amount occupied by each of the multiple data tensors asked for when the neural network model processes a single frame of speech data is obtained, the memory sizes of the two data tensors (i.e., the two first target data tensors) that the signal-frame memory overhead is the largest are calculated based on the memory amount occupied by each of the data tensors. The electronic device may set the sum of memory sizes required by the two data tensors (i.e., a sum of a memory 1 and a memory 2) as the memory amount of the common memory. For the two data tensors in embodiments (that is, the two first target data tensors), their memories may be assigned to a starting address of the common memory and the starting address plus an offset of the memory 1 respectively. Therefore, the neural network model (for example, the scoring-based neural network model) may receive a single frame of speech data as the input each time, to streaming calculate each layer of the neural network model sequentially, thereby flexibly utilizing the common memory and reducing the occupation of the memory.

In embodiments of the disclosure, when h==1 in the data tensor, although the memory is minimized, multiple loadings of the memory may be raised when a scale of neural network parameters of a certain layer in the neural network model is too large.

Figure 3:
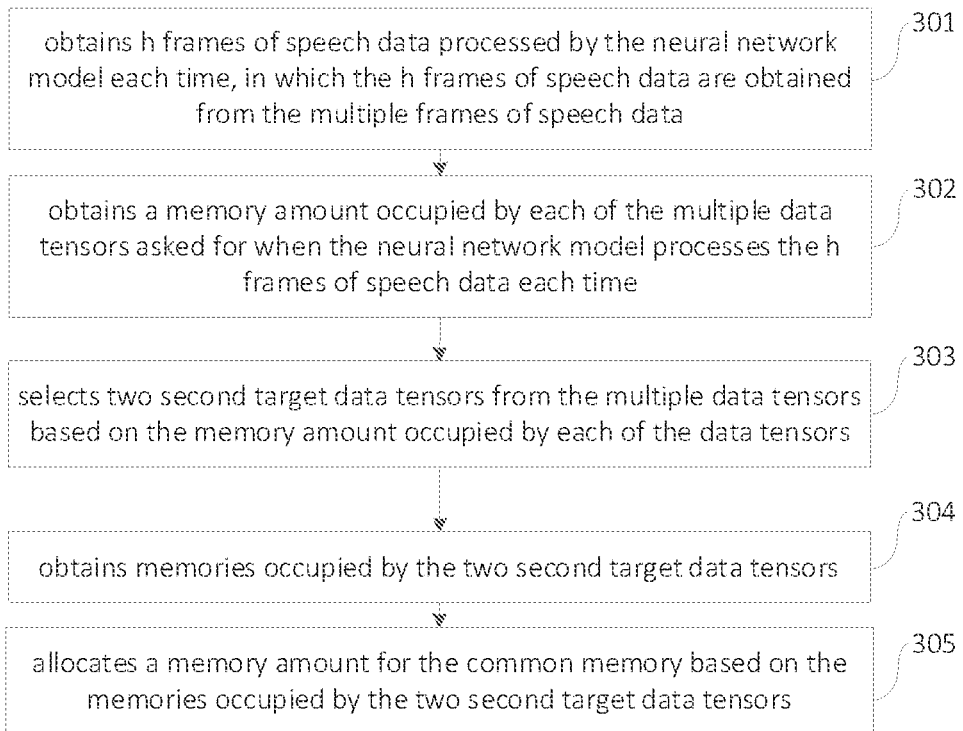
FIG. 3 is a flowchart illustrating another method for allocating memory according to embodiments of the disclosure.

In order to solve the problem, in the disclosure, when the current speech data is not the first-frame speech data, the memory amount is allocated for the comment memory in the multi-frame allocation mode. In some embodiments of the disclosure, as illustrated in FIG. 3, allocating the memory amount for the common memory in the second allocation mode may include the following.

At block 301, h frames of speech data processed by the neural network model each time are obtained. The h frames of speech data are obtained from the multiple frames of speech data.

In some embodiment of the disclosure, h may be 6 or 12. It is to be noted that, when h equals to 6, the h frames of speech data can be frames of speech data within 60 ms. When h equals to 12, the h frames of speech data can be frames of speech data within 120 ms.

In some embodiments of the disclosure, h may be set as a critical value of reducing the memory problem based on the actual requirement or a value based on characteristics of the speech algorithm. Generally, in the speech recognition, the data of 60 ms or 120 ms may be processed each time, which may not bring delay of the speech recognition. In this way, h may be set as 6 or 12.

It is to be noted that, since the above method for allocating the memory amount for the common memory in the first allocation mode reduces the overhead of the temporary memory, even if h equals to 6 or 12, the memory increasing is limited. However, in this case, the efficiency loss caused by the memory problem may be compensated. Thus, the calculation overhead is equivalent to or superior to the existing methods (since with the memory of the data tensor allocated by the existing method, the data may not be effectively cached, causing the cache miss and affecting the computation efficiency).

In other embodiments of the disclosure, when h equals to 6, the h frames of speech data are 6 frames of speech data. When h equals to 12, the h frames of speech data are 12 frames of speech data.

At block 302, the memory amount occupied by each of the multiple data tensors asked for when the neural network model processes the h frames of speech data each time is obtained.

It is to be noted that, each data tensor mentioned in embodiments generally has four dimensions, i.e., n, c, h, and w. In the actual application, when h==6 or h==12, the h-frame memory size may be h*c*w.

At block 303, two second target data tensors are selected from the multiple data tensors based on the memory amount occupied by each of the data tensors.

At block 304, memories occupied by the two second target data tensors are obtained.

At block 305, the memory amount is allocated for the common memory based on the memories occupied by the two second target data tensors.

In detail, after the electronic device inputs the multiple frames of speech data to the neural network model, it may be determined whether the current speech data is the first-frame speech data through the neural network model. When the current speech data is not the first-frame speech data, the h frames of speech data processed by the neural network model each time are obtained from the multiple frames of speech data, and the memory amount occupied by each of the multiple data tensors asked for when the neural network model processes the h frames of speech data each time is obtained. The memory sizes of two data tensors that are top two of h-frame memory overheads (i.e., the two second target data tensors) are obtained based on the memory amount occupied by each of the data tensors. The electronic device may set the sum of the memory sizes required by the two data tensors as the memory amount of the common cache. Therefore, the efficiency loss caused by the memory problem may be compensated, and calculation overhead is equivalent to or superior to the conventional method, thereby ensuring the balance between the memory and the computation.

In embodiments of the disclosure, in the neural network of the neural network model, there is implementation of the convolutional layers. That is, the number of frames input at the first time is set based on the configuration of the convolutional layer. For example, a convolution kernel of 3×3 may have a two-frame delay without padding. Each time such a convolutional layer is added, the h may increase by 2. For a deep convolutional network, the first-frame input may be frames within 20 ms or 30 ms. For scoring the entire sentence, the h may be 300-1000 (frames within 3 s to 10 s).

This value may not be divisible by 6 or 12, resulting in confusion of the scoring structure. In this case, the method for allocating memory according to embodiments of the disclosure may effectively solve this problem. To allocate the memory, the allocated memory size is still for h==6 or h==12. When performing the first-frame computing, the computation is performed in the h==1 mode. After the first-frame computing, the computation is performed based on 6 frames or 12 frames each time, and the mode can be automatically configured in the neural network model. After the initialization of the neural network model, the first-frame mode is entered. After the computation of the number of frames corresponding to the first-frame mode is finished, the multi-frame mode is automatically switched to.

Therefore, the memory overhead may be effectively reduced and a balance between the memory and the computation may be achieved.

Figure 4:
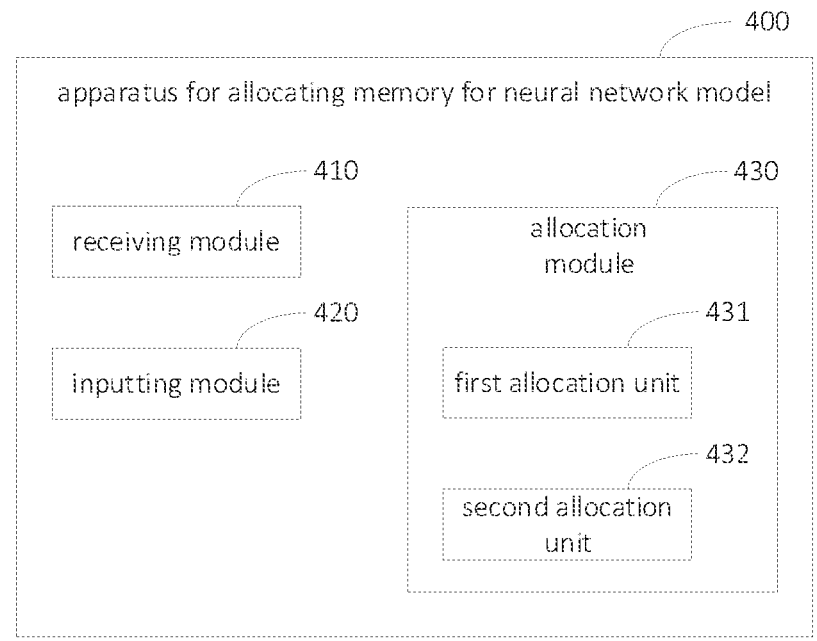
FIG. 4 is a schematic diagram illustrating a structure of an apparatus for allocating memory according to embodiments of the disclosure.

FIG. 4 is a diagram illustrating a structure of an apparatus for allocating memory according to embodiments of the disclosure.

The apparatus for allocating memory according to embodiments of the disclosure may be integrated in an electronic device. The multiple frames of speech data are received and input to a neural network model. The neural network model asks for multiple data tensors when processing the multiple frames of speech data, and the multiple data tensors share a common memory, to reduce memory overhead.

As illustrated in FIG. 4, the apparatus for allocating memory may include a receiving module 410 and an inputting module 420.

The receiving module 410 is configured to receive multiple frames of speech data.

In embodiments of the disclosure, the electronic device may receive the multiple frames of speech data through the receiving module 410. It is to be noted that, the multiple frames of speech data as described in embodiments may be temporarily stored in a sound file (for example, a file in a WAV format), such that the receiving module 410 can easily receive (or obtain) the multiple frames of speech data or the receiving module 410 directly receives the speech information input by the user through a microphone and converts the speech information into the multiple frames of speech data, which is not limited here.

The inputting module 420 is configured to input the multiple frames of speech data to a neural network model. The neural network model asks for multiple data tensors while processing the multiple frames of speech data and the multiple data tensors share a common memory.

It is to be noted that, the neural network model mentioned in embodiments may be trained and stored in advance in a storage space of the electronic device for calling and using. The storage space is not limited to the storage space of a physical entity, for example, a hard disk. In addition, the storage space may be a storage space of a network hard disk connected to the electronic device (i.e., a cloud storage space). The neural network model may be a scoring-based neural network model for scoring the multiple frames of speech data, and the neural network model may include multiple layers.

In detail, after the receiving module 410 receives the multiple frames of speech data, the inputting module 420 may call the neural network model from the storage space and input the multiple frames of speech data to the neural network model such that the multiple frames of speech data are scored through the neural network model to obtain the scoring result output by the neural network model. It is to be noted that, after receiving the multiple frames of speech data, the receiving module 410 may divide the multiple frames of speech data into multiple segments based on a preset algorithm, and sequentially input the segments of the multiple frames of speech data to the neural network model. The preset algorithm may be calibrated according to the actual situation.

In order to improve the scoring accuracy, in some embodiments of the disclosure, after receiving the multiple frames of speech data, the receiving module 410 may process the multiple frames of speech data in advance, for example, to eliminate the influence on the quality of the speech data due to aliasing, high harmonic distortion, high frequency of the human's vocal organ and the speech data collection device.

Further, in some embodiments of the application, the multiple data tensors asked for by the neural network model while processing the multiple frames of speech data may be temporary, for temporarily storing data exchanged between layers. The multiple data tensors may share the common memory.

It is to be noted that, the multiple data tensors mentioned in embodiments may be released after a certain condition is met. For example, after some data tensors are called as an input by a layer A (for example, a certain layer of the neural network model), these data tensors cannot be called by other layers any longer. After computing of the A layer is finished, the data tensors may be released, thereby reducing the occupation of the memory.

In addition, in some neural network structures, most of the data tensors may be each connected to a single input layer A and as an output of another layer B. The memories of these data tensors may be reused, thereby reducing the memory overhead.

In embodiments of the disclosure, the multiple frames of speech data are received through the receiving module and the multiple frames of speech data are input to the neural network model through the inputting module. The neural network model asks for the multiple data tensors while processing the multiple frames of speech data, and the multiple data tensors share the common memory. Therefore, the memory overhead may be effectively reduced and a balance between the memory and the computation may be achieved.

In some embodiments of the disclosure, as illustrated in FIG. 4, the apparatus 400 for allocating memory may further include an allocation module 430. The allocation module 430 is configured to allocate a memory amount for the common memory based on the number of frames of current speech data.

In some embodiments of the disclosure, as illustrated in FIG. 4, the allocation module 430 may include a first allocation unit 431 and a second allocation unit 432.

The first allocation unit 431 is configured to allocate the memory amount for the common memory in a first allocation mode when the current speech data is first-frame speech data.

The second allocation unit 432 is configured to allocate the memory amount for the common memory in a second allocation mode when the current speech data is not the first-frame speech data.

In some embodiments of the disclosure, as illustrated in FIG. 4, the first allocation unit 431 is further configured to obtain the memory amount occupied by each of the multiple data tensors asked for when the neural network model processes a single frame of speech data; select two first target data tensors from the multiple data tensors based on the memory amount occupied by each of the data tensors; obtain memories occupied by the two first target data tensors; and allocate the memory amount for the common memory based on the memories occupied by the two first target data tensors.

In some embodiments of the disclosure, as illustrated in FIG. 4, the second allocation unit 432 is further configured to obtain h frames of speech data processed by the neural network model each time. The h frames of speech data are obtained from the multiple frames of speech data. The second allocation unit 432 is further configured to obtain the memory amount occupied by each of the multiple data tensors asked for when the neural network model processes the h frames of speech data; select two second target data tensors from the multiple data tensors based on the memory amount occupied by each of the data tensors; obtain memories occupied by the two second target data tensors; and allocate the memory amount for the common memory based on the memories occupied by the two second target data tensors.

In some embodiments of the disclosure, h may be 6 or 12.

It is to be noted that the foregoing explanations of the embodiments of a method for allocating memory also suitable to the apparatus for allocating memory according to embodiments, which will not be repeated here.

With the apparatus for allocating memory according to embodiments of the disclosure, the multiple frames of speech data are received and input to the neural network model, where the neural network model asks for multiple data tensors while processing the multiple frames of speech data, and the multiple data tensors share a common memory. Therefore, a memory overhead may be effectively reduced and a balance between the memory and the computation may be achieved.

In some embodiments of the disclosure, an electronic device, a readable storage medium and a computer program product are further provided.

Figure 5:
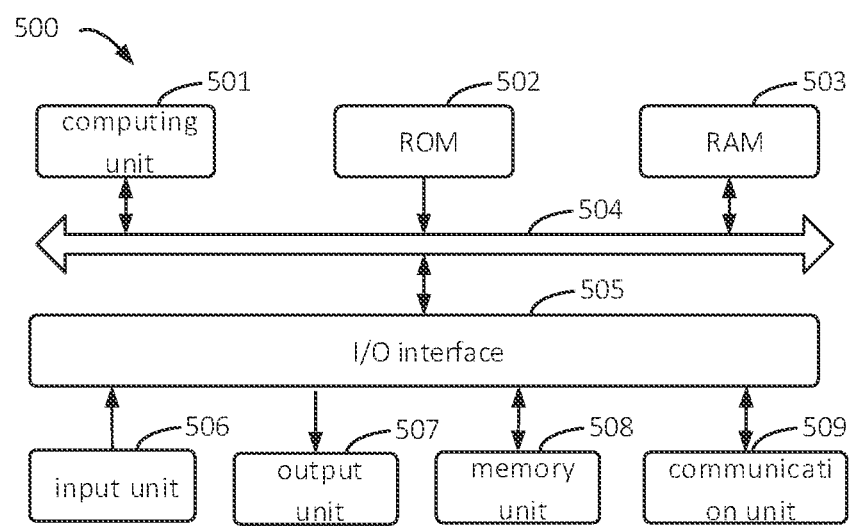
FIG. 5 is a block diagram illustrating an electronic device for executing a method for allocating memory according to embodiments of the disclosure.

FIG. 5 is a schematic block diagram illustrating an example electronic device 500 according to embodiments of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 5, a device 500 includes a computing unit 501, configured to execute various appropriate actions and processes according to a computer program stored in a read-only memory (ROM) 502 or loaded from a memory unit 505 to a random access memory (RAM) 503. In a RAM 503, various programs and data required for a device 500 may be stored. A computing unit 501, a ROM 502 and a ROM 503 may be connected with each other by a bus 504. An input/output (I/O) interface 505 is also connected to a bus 504.

A plurality of components in the device 500 are connected to an I/O interface 505, and includes: an input unit 506, for example, a keyboard, a mouse, etc.; an output unit 507, for example various types of displays, speakers; a memory unit 505, for example a magnetic disk, an optical disk; and a communication unit 509, for example, a network card, a modem, a wireless transceiver. A communication unit 509 allows a device 500 to exchange information/data through a computer network such as internet and/or various types of telecommunication networks and other devices.

A computing unit 501 may be various types of general and/or dedicated processing components with processing and computing ability. Some examples of a computing unit 501 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 501 executes various methods and processing as described above, for example, a method for memory allocation. For example, in some embodiments, a method for memory allocation may be further implemented as a computer software program, which is physically contained in a machine readable medium, such as a memory unit 505. In some embodiments, a part or all of the computer program may be loaded and/or installed on the device 500 through a ROM 502 and/or a communication unit 509. When the computer program is loaded on a RAM 503 and executed by a computing unit 501, one or more blocks in the method for memory allocation as described above may be performed. Alternatively, in other embodiments, a computing unit 501 may be configured to execute a method for allocating memory in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an electrically programmable read-only memory (an EPROM or a flash memory), an optical fiber device, and a compact disc read-only memory (CDROM), an optical storage device, a magnetic storage device, or any appropriate combination of the above.

In order to provide interaction with the user, the systems and technologies described here may be implemented on a computer, and the computer has: a display apparatus configured to display information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN) and an internet, an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the disclosure may be executed in parallel, sequentially, or in a different order, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of embodiments of the disclosure.

What is claimed is:

1. A method for allocating memory, comprising:
receiving multiple frames of speech data;
inputting the multiple frames of speech data to a neural network model, wherein the neural network model is configured to ask for multiple data tensors while processing the multiple frames of speech data and the multiple data tensors share a common memory;
allocating a memory amount for the common memory in a first allocation mode based on the current speech data being first-frame speech data; and
allocating a memory amount for the common memory in a second allocation mode based on the current speech data being not the first-frame speech data.

2. The method of claim 1, wherein, allocating the memory amount for the common memory in the first allocation mode comprises:
obtaining a memory amount occupied by each of the multiple data tensors asked for when the neural network model processes a single frame of speech data;
selecting two first target data tensors from the multiple data tensors based on the memory amount occupied by each of the data tensors;
obtaining memories occupied by the two first target data tensors; and
allocating the memory amount for the common memory based on the memories occupied by the two first target data tensors.

3. The method of claim 1, wherein allocating the memory amount for the common memory in the second allocation mode comprises:

obtaining h frames of speech data processed by the neural network model each time, wherein the h frames of speech data are obtained from the multiple frames of speech data;

obtaining a memory amount occupied by each of the multiple data tensors asked for when the neural network model processes the h frames of speech data each time;

selecting two second target data tensors from the multiple data tensors based on the memory amount occupied by each of the data tensors;

obtaining memories occupied by the two second target data tensors; and allocating the memory amount for the common memory based on the memories occupied by the two second target data tensors.

4. The method of claim 3, wherein h equals to 6 or 12.

5. An electronic device, comprising:

at least one processor; and a memory, communicatively coupled to the at least one processor;

wherein, the memory stores instructions executable by the at least one processor, and when the instructions are executed by the at least one processor, the at least one processor is configured to:

receive multiple frames of speech data;

input the multiple frames of speech data to a neural network model, wherein the neural network model is configured to ask for multiple data tensors while processing the multiple frames of speech data and the multiple data tensors share a common memory;

allocate a memory amount for the common memory in a first allocation mode based on the current speech data being first-frame speech data; and allocate a memory amount for the common memory in a second allocation mode based on the current speech data being not the first-frame speech data.

6. The electronic device of claim 5, wherein the processor is further configured to:

obtain a memory amount occupied by each of the multiple data tensors asked for when the neural network model processes a single frame of speech data;

select two first target data tensors from the multiple data tensors based on the memory amount occupied by each of the data tensors;

obtain memories occupied by the two first target data tensors; and allocate the memory amount for the common memory based on the memories occupied by the two first target data tensors.

7. The electronic device of claim 5, wherein the processor is further configured to:

obtain h frames of speech data processed by the neural network model each time, wherein the h frames of speech data are obtained from the multiple frames of speech data;

obtain a memory amount occupied by each of the multiple data tensors asked for when the neural network model processes the h frames of speech data each time;

select two second target data tensors from the multiple data tensors based on the memory amount occupied by each of the data tensors;

obtain memories occupied by the two second target data tensors; and allocate the memory amount for the common memory based on the memories occupied by the two second target data tensors.

8. The electronic device of claim 7, wherein h equals to 6 or 12.

9. A non-transitory computer-readable storage medium storing computer instructions, wherein the computer instructions are configured to cause a computer to execute a method for allocating memory, the method comprising:

receiving multiple frames of speech data;

inputting the multiple frames of speech data to a neural network model, wherein the neural network model is configured to ask for multiple data tensors while processing the multiple frames of speech data and the multiple data tensors share a common memory;

allocating the memory amount for the common memory in a first allocation mode based on the current speech data being first-frame speech data; and allocating the memory amount for the common memory in a second allocation mode based on the current speech data being not the first-frame speech data.

10. The non-transitory computer-readable storage medium of claim 9, wherein allocating the memory amount for the common memory in the first allocation mode comprises:

obtaining a memory amount occupied by each of the multiple data tensors asked for when the neural network model processes a single frame of speech data;

selecting two first target data tensors from the multiple data tensors based on the memory amount occupied by each of the data tensors;

obtaining memories occupied by the two first target data tensors; and allocating the memory amount for the common memory based on the memories occupied by the two first target data tensors.

11. The non-transitory computer-readable storage medium of claim 9, wherein allocating the memory amount for the common memory in the second allocation mode comprises:

obtaining h frames of speech data processed by the neural network model each time, wherein the h frames of speech data are obtained from the multiple frames of speech data;

obtaining a memory amount occupied by each of the multiple data tensors asked for when the neural network model processes the h frames of speech data each time;

selecting two second target data tensors from the multiple data tensors based on the memory amount occupied by each of the data tensors;

obtaining memories occupied by the two second target data tensors; and allocating the memory amount for the common memory based on the memories occupied by the two second target data tensors.

12. The non-transitory computer-readable storage medium of claim 11, wherein h equals to 6 or 12.

\* \* \* \* \*